US006990605B2

(12) United States Patent
Noda et al.

(10) Patent No.: US 6,990,605 B2
(45) Date of Patent: Jan. 24, 2006

(54) METHODS AND APPARATUS FOR RECOVERING WORK OF ONE COMPUTER BY ANOTHER COMPUTERS

(75) Inventors: Yusuke Noda, Ninomiya (JP); Masahiro Kurosawa, Yokohama (JP); Tomomi Suzuki, Yamato (JP)

(73) Assignee: Hitachi, Ltd., Tokyo (JP)

( * ) Notice: Subject to any disclaimer, the term of this patent is extended or adjusted under 35 U.S.C. 154(b) by 302 days.

(21) Appl. No.: 10/649,748

(22) Filed: Aug. 28, 2003

(65) Prior Publication Data

US 2004/0205382 A1    Oct. 14, 2004

(30) Foreign Application Priority Data

Mar. 27, 2003   (JP)   ............................. 2003-086897

(51) Int. Cl.
   *G06F 11/00* (2006.01)
(52) U.S. Cl. ................................. 714/6; 714/4; 714/2
(58) Field of Classification Search .................... 714/4, 714/6, 2, 24, 20
   See application file for complete search history.

(56) References Cited

U.S. PATENT DOCUMENTS

| | | | |
|---|---|---|---|
| 5,404,508 A | | 4/1995 | Konrad et al. .............. 707/202 |
| 5,513,314 A | * | 4/1996 | Kandasamy et al. ........... 714/6 |
| 5,596,707 A | | 1/1997 | Ohta ............... 714/6 |
| 5,758,359 A | | 5/1998 | Saxon ........................ 707/204 |
| 5,796,934 A | | 8/1998 | Bhanot et al. ................. 714/4 |
| 5,930,824 A | | 7/1999 | Anglin et al. ............... 711/162 |
| 5,966,730 A | * | 10/1999 | Zulch ......................... 711/162 |
| 6,163,856 A | * | 12/2000 | Dion et al. ..................... 714/4 |
| 6,182,086 B1 | * | 1/2001 | Lomet et al. ............... 707/202 |
| 6,247,141 B1 | | 6/2001 | Holmberg ..................... 714/2 |
| 6,266,784 B1 | * | 7/2001 | Hsiao et al. ................... 714/6 |
| 6,636,988 B1 | * | 10/2003 | Firley et al. ................. 714/15 |
| 6,728,898 B2 | * | 4/2004 | Tremblay et al. .............. 714/6 |
| 6,785,786 B1 | | 8/2004 | Gold et al. ................. 711/162 |
| 2001/0056554 A1 | * | 12/2001 | Chrabaszcz ................. 714/13 |
| 2003/0084372 A1 | | 5/2003 | Mock et al. ................. 714/15 |
| 2003/0225646 A1 | | 12/2003 | Failla et al. ................. 705/35 |
| 2004/0078628 A1 | | 4/2004 | Akamatu et al. .............. 714/4 |

FOREIGN PATENT DOCUMENTS

JP    A-2001-265726    9/2001

* cited by examiner

*Primary Examiner*—Robert Beausoliel
*Assistant Examiner*—Christopher McCarthy
(74) *Attorney, Agent, or Firm*—Mattingly, Stanger, Malur & Brundidge, P.C.

(57) ABSTRACT

This invention is for a relatively loose recovery of data still not backed up at the time of a failure by later inputting it. A recovery method of recovering processes at a data center when a failure occurs at another data center during execution of the process, has a step of transmitting data at a first data center normally used to a second data center at a predetermined interval and backup at the second data center; a step of, when the first data center breaks down, selecting an information processing apparatus of which recovery time including a time for inputting data not backed up satisfies a requested recovery time, from the second data center; and a step of deploying applications used at the first data center in the selected information apparatus and recovering the data from the backup.

12 Claims, 11 Drawing Sheets

FIG. 8

| APPLICATION NAME | INPUT TIME | DATA TRANSFER TIME INTERVEL | DATA GENERATION FREQUENCY | DEPLOY TIME | REQUESTED RECOVERY TIME | PRIORITY LEVEL | ADDITIONAL ITEM |
|---|---|---|---|---|---|---|---|
| APPLICATION 1 | 2 SEC PER ONE DATA SET | 12 HOURS | 100 TIMES PER HOUR | 10 MIN | 1 HOUR | 0.5 | ------ |
| APPLICATION 1 | 1.5 SEC PER ONE DATA SET | 12 HOURS | 60 TIMES PER HOUR | 5 MIN | 2 HOUR | 0.2 | --- |
| APPLICATION 1 | 1 SEC PER ONE DATA SET | 24 HOURS | 20 TIMES PER HOUR | 7 MIN | 5 HOUR | 0.1 | --- |
| APPLICATION 1 | 2 SEC PER ONE DATA SET | 24 HOURS | 30 TIMES PER HOUR | 3 MIN | 3 HOUR | 0.2 | --- |
| --- | --- | --- | --- | --- | --- | --- | --- |

FIG. 9

| ID | USE | DEPLOY TIME RATIO | DATA RECOVERY TIME RATIO | ADDITIONAL ITEM |
|---|---|---|---|---|
| #001 | APPLICATIONS 1, 2 | 1.0 | 1.0 | ------ |
| #002 | APPLICATIONS 1, 3 | 2.0 | 1.5 | --- |
| #003 | APPLICATIONS 2, 4 | 0.5 | 0.5 | --- |
| #004 | APPLICATIONS 3, 5 | 1.5 | 1.5 | --- |
| --- | --- | --- | --- | --- |

FIG. 11

| USER | PRIORITY LEVEL |
|---|---|
| USER 1 | 0.7 |
| USER 2 | 0.2 |
| USER 3 | 0.1 |
| ⋮ | ⋮ |

METHODS AND APPARATUS FOR RECOVERING WORK OF ONE COMPUTER BY ANOTHER COMPUTERS

BACKGROUND OF THE INVENTION

The present invention relates to techniques of recovering a process at a data center when a failure occurs at another data center during the execution of the process.

In a conventional recovery system (a recovery system intended to recover the system) such as an on-line system of banking facilities, synchronously when data is renewed, a backup of data is obtained not to lose data or to reduce data loss.

A high speed and automatic recovery method and system for recovering a computer work load has been proposed. This conventional recovery method comprises steps of: expressing requirements of a computer system, associated networking and peripheral apparatuses; allowing a customer to designate a recovery command; processing the recovery command at a recovery site; and utilizing a computer to process the recovery command, to assign resources at the recovery site and to reconfigure the computer system. The recovery process is automatically performed by matching the system requirements with available resources. (For example, refer to JP-A-2001-265726.)

Since a conventional recovery system aims at no data loss, it is necessary to adopt the recovery system of no data loss and high cost.

SUMMARY OF THE INVENTION

It is an object of the invention to provide the technique which can meet the needs for a relatively loose recovery of data still not backed up at the time of a failure by later inputting it (e.g., manually) and by acquiring a backup of data regularly (e.g., once per day).

According to the invention, in a disaster recovery system for recovering a process at a data center when a failure occurs at another data center during execution of the process, the recovery process is performed by an information processing apparatus whose necessary recovery time including a time taken to input data still not backed up satisfies a predetermined requested recovery time.

In the disaster recovery system of the invention, first, data at a first data center normally used by an end user is transmitted regularly to a second data center at a predetermined time interval and a backup of the received data is formed at the second data center.

When a failure occurs at the first data center and the end user cannot use the application at the first data center, an information processing apparatus whose necessary recovery time including a time taken to input data still not backed up satisfies a predetermined requested recovery time is selected from information processing apparatuses in the second data center.

When a specific information processing apparatus is selected from information processing apparatuses in the second data center, the application used at the first data center is deployed in the selected information processing apparatus and the data at the first data center is recovered from the backup data formed in the second data center at the selected specific information processing apparatus to thereby recover the process at the first data center.

As above, according to the disaster recovery system of the invention, it is possible to meet the needs for a relatively loose recovery of data still not backed up at the time of a failure by later inputting it.

Other objects, features and advantages of the invention will become apparent from the following description of the embodiments of the invention taken in conjunction with the accompanying drawings.

BRIEF DESCRIPTION OF THE DRAWINGS

FIG. 8 is a diagram showing an example of an application information table 208 according to the embodiment.

FIG. 9 is a diagram showing an example of a server list table 209 according to the embodiment.

FIG. 11 is a diagram showing an example of a user priority level table 210 according to the embodiment.

DESCRIPTION OF THE EMBODIMENT

An embodiment of a disaster recovery system will be described which recovers a process at a data center (DC) when a failure occurs at another DC while executing the process.

Figure 1:
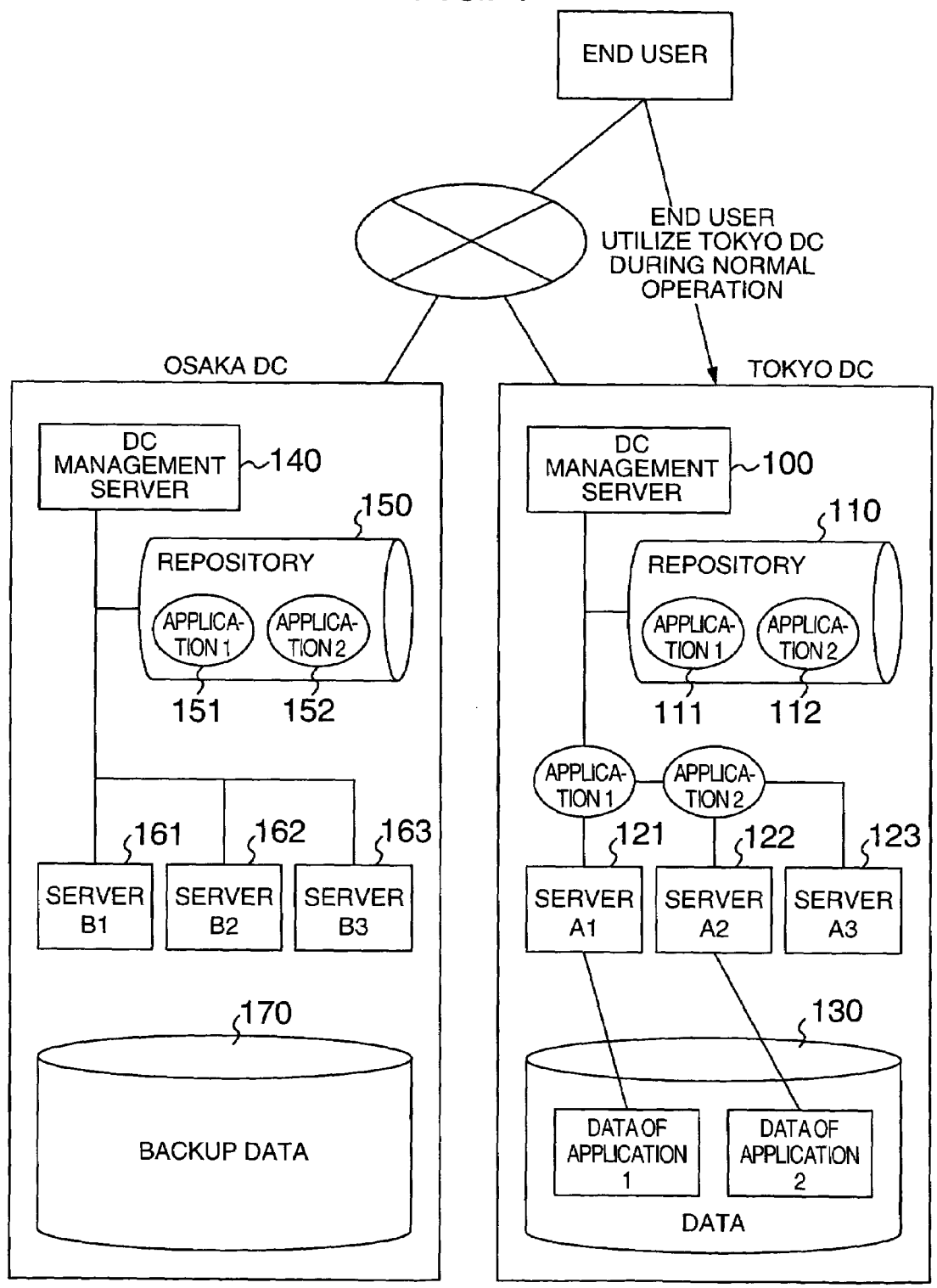
FIG. 1 is a diagram illustrating a normal operation before a failure occurs at a Tokyo data center (DC) according to an embodiment.

FIG. 1 is a diagram illustrating the normal operation before a failure occurs at a Tokyo DC according to the embodiment. As shown in FIG. 1, in the disaster recovery system of this embodiment, the Tokyo DC or first DC used by a computer of an end user and an Osaka DC or second DC used during a failure of the Tokyo DC are interconnected by a network. During the normal operation, an end user utilizes applications 111 and 112 at the Tokyo DC.

Figure 2:
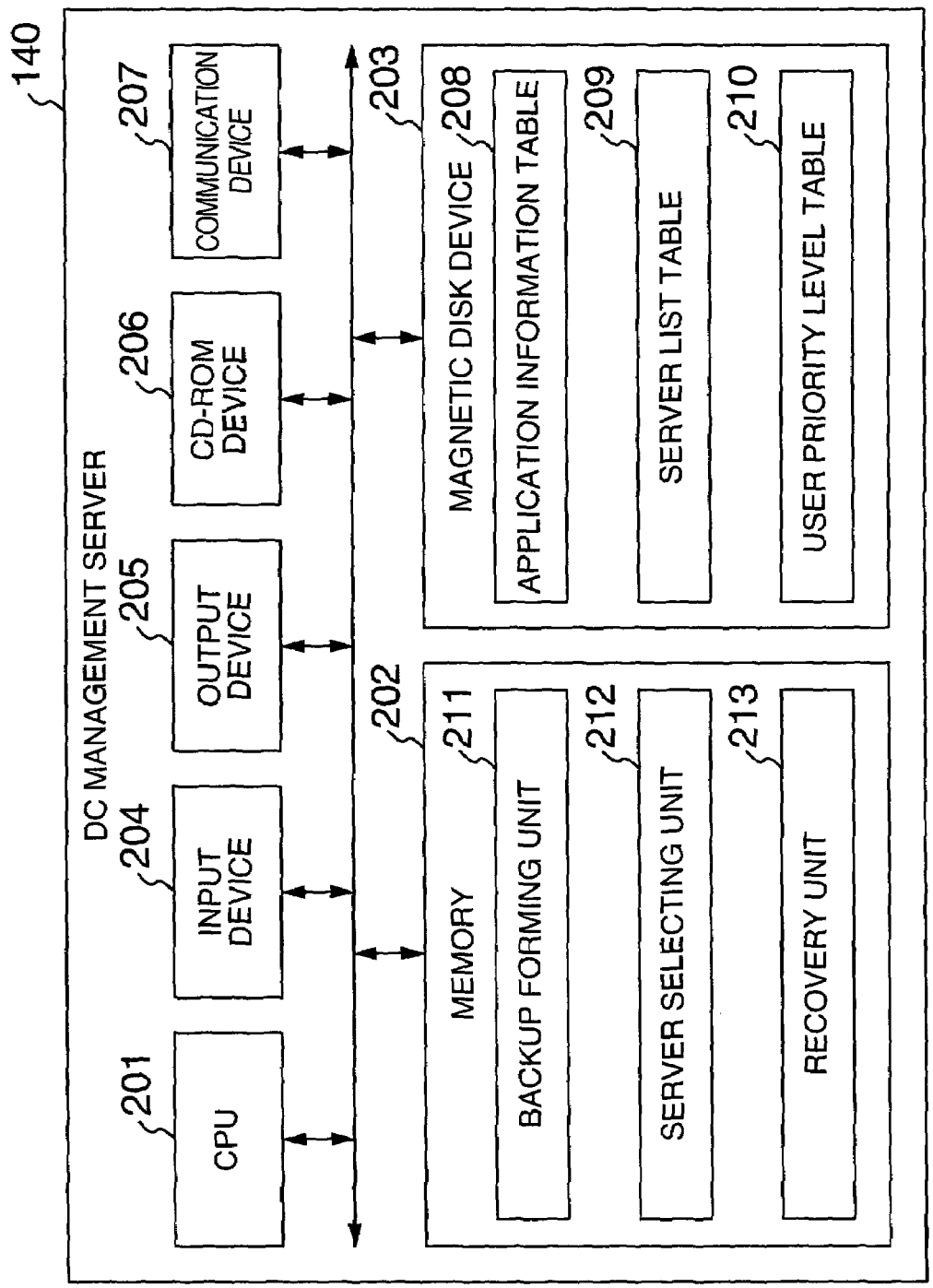
FIG. 2 is a diagram showing an outline structure of a DC management server 140 of the embodiment.

FIG. 2 is a diagram showing the outline structure of a DC management server 140 according to the embodiment. As shown in FIG. 2, the DC management server 140 of this embodiment has a CPU 201, a memory 202, a magnetic disk device 203, an input device 204, an output device 205, a CD-ROM device 206, a communication device 207, an application information table 208, a server list table 209, and a user priority level table 210.

CPU 201 is a device for controlling the whole operation of the DC management server 140. The memory 202 is a storage device in which various programs and data necessary for controlling the whole operation of the DC management server 140 are loaded.

The magnetic disk device 203 is a storage device for storing the various programs and data. The input device 204 is used for entering various inputs necessary for the recovery of the Tokyo DC. The output device 205 is used for sending various outputs necessary for the recovery of the Tokyo DC.

The CD-ROM device 206 is a device for reading the contents of a CD-ROM in which the various programs are recorded. The communication device 207 is a device for communicating with other information processing apparatuses such as the Tokyo DC and an end user via a network such as the Internet and an intranet.

The application information table 208 is a table for storing information of applications to be used by an end user. The server list table 209 is a table for storing the list of servers available for the recovery. The user priority level table 210 is a table for storing information of a priority level of each user.

The DC management server 140 has also a backup forming unit 211, a server selecting unit 212 and a recovery unit 213.

The backup forming unit 211 receives application data 130 at the Tokyo DC used by an end user in the normal operation at a predetermined time interval to make backup data 170 of the application data 130 at the Osaka DC. The backup forming unit 211 adjusts a time interval of the backup in order to make a necessary recovery time to be later described satisfy a predetermined requested recovery time.

The server selecting unit 212 is an information processing apparatus selecting unit for selecting a server or servers whose necessary recovery time satisfies the predetermined requested recovery time, from servers 161 to 163 at the Osaka DC. The necessary recovery time includes: a time taken to deploy applications 151 and 152 same as applications 111 and 112 used at the Tokyo DC in the Osaka DC; a time taken to recover data from the backup data 170 at the Osaka DC; and a time taken to input data still not backed up to the Osaka DC, respectively when a failure occurs at the Tokyo DC.

The recovery unit 213 deploys the applications 151 and 152 same as the applications 111 and 112 used at the Tokyo DC in the selected server or servers, and recovers the application data 130 at the Tokyo DC from the backup data 170 at the selected server or servers.

The programs for making the DC management server 140 function as the backup forming unit 211, server selecting unit 212 and recovery unit 213 are assumed to be recorded in a recording medium such as a CD-ROM, loaded in a magnetic disk or the like, loaded in the memory and executed. The storage medium for recording the programs may be another recording medium different from a CD-ROM. The programs may be installed from the recording medium into an information processing apparatus, or may be accessed via a network to execute them.

If the Tokyo DC makes a backup, the DC management server 100 at the Tokyo DC performs the processes similar to those of the DC management server 140 described above.

Figure 3:
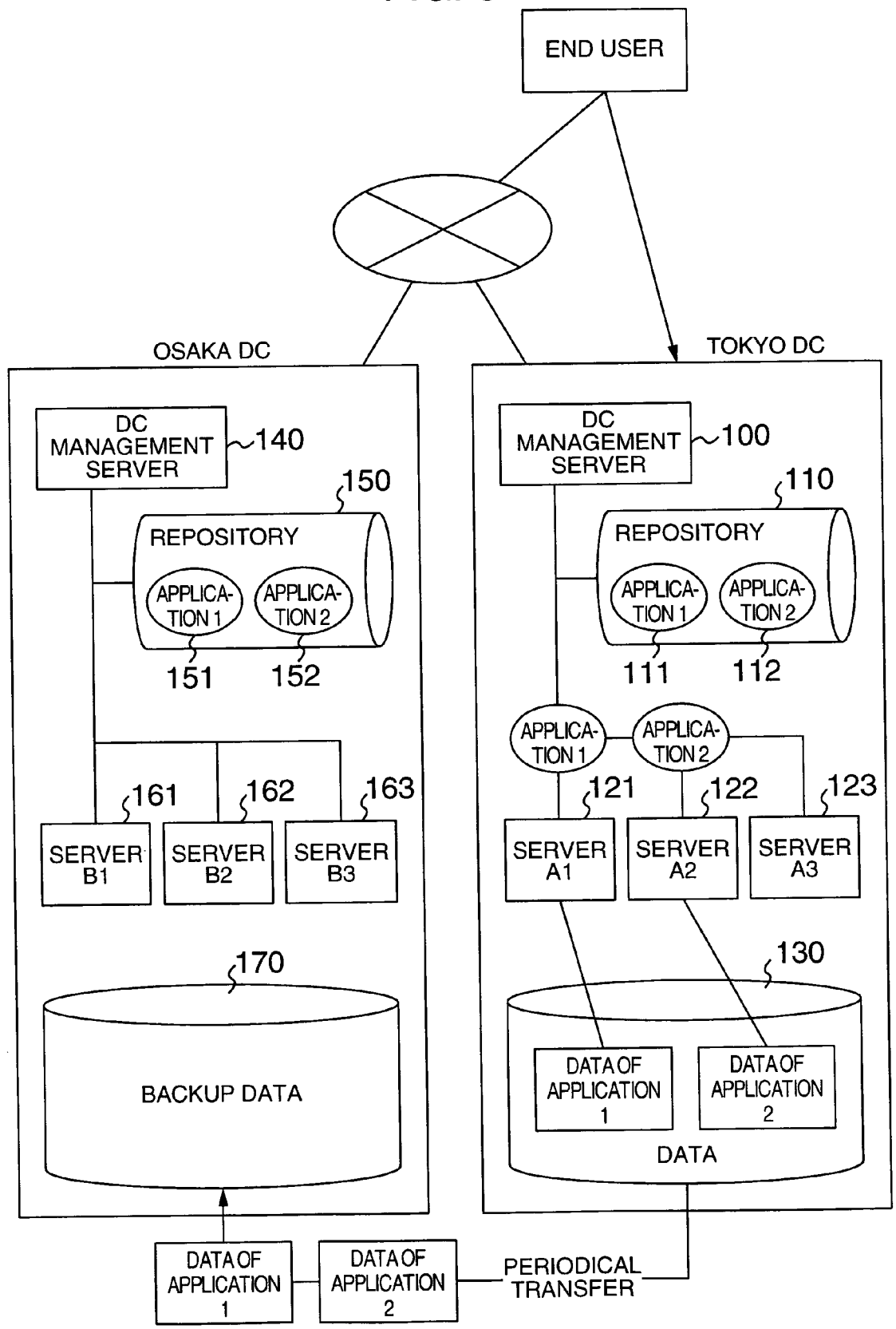
FIG. 3 is a diagram illustrating a backup data transfer from the Tokyo DC to an Osaka DC during a normal operation according to the embodiment.

FIG. 3 is a diagram illustrating an operation of transferring backup data from the Tokyo DC to the Osaka DC during the normal operation. As shown in FIG. 3, the Osaka DC the backup forming unit 211 of the DC management server 140 receives the application data 130 at the Tokyo DC used by an end user during the normal operation at a predetermined data transfer interval and makes the backup data 170 of the application data 130. In this case, the backup forming unit 211 of the DC management server 140 at the Osaka DC issues a transfer request for the application data 130 to the DC management server 100 at the Tokyo DC at the predetermined data transfer interval. Instead, the backup forming unit 211 may adjust the data transfer interval for the backup in such a manner that the necessary recovery time satisfies the predetermined requested recovery time in the application information table 208.

Figure 4:
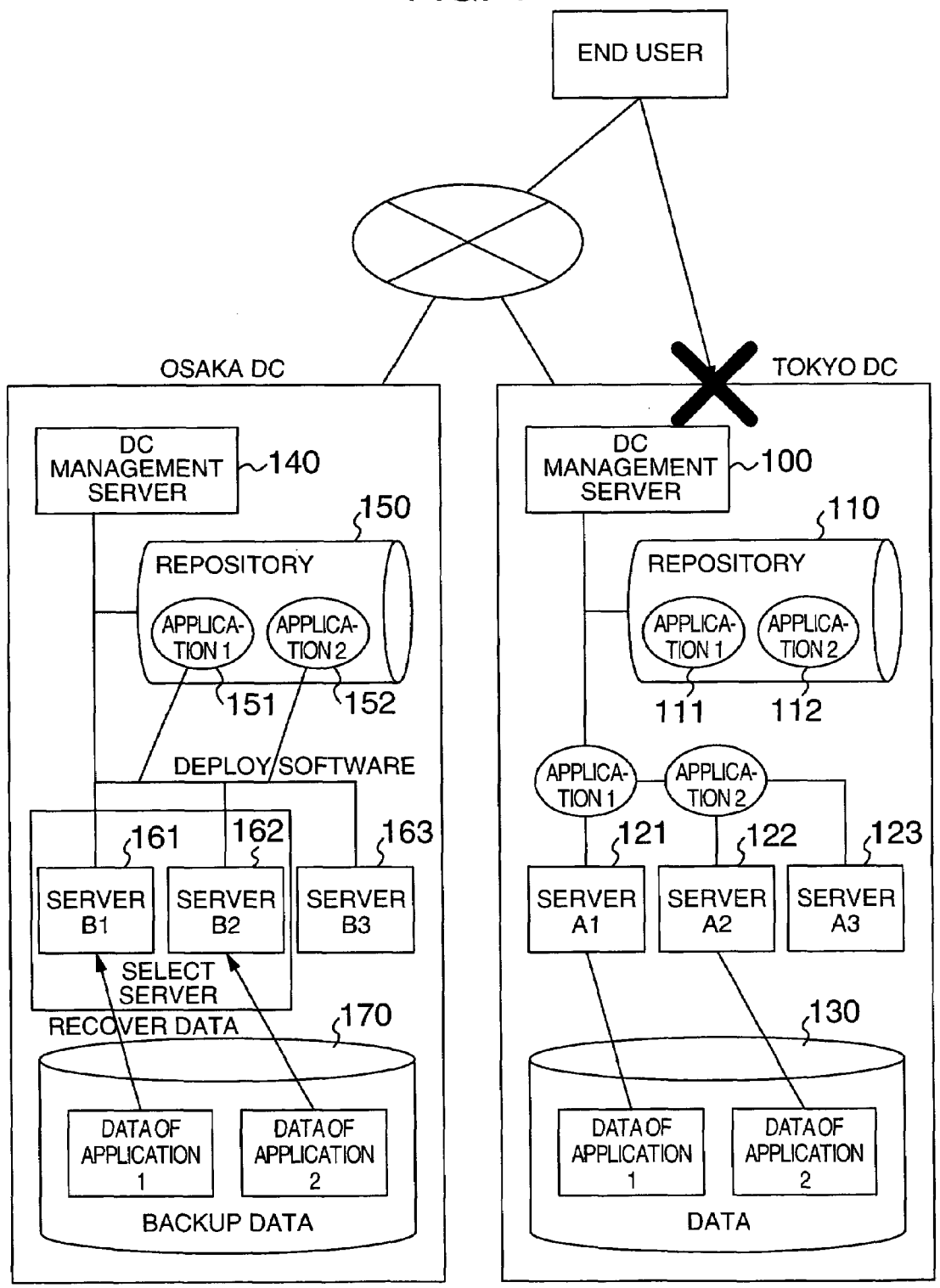
FIG. 4 is a diagram illustrating the summary of selection of a recovery server at the Osaka DC, deployment of an application, and recovery by backup data when a failure occurs at the Tokyo DC according to the embodiment.

FIG. 4 is a diagram showing the outline of selection of a recovery server at the Osaka DC, deployment of an application, and recovery of backup data to be performed when a failure occurs at the Tokyo DC. As shown in FIG. 4, in the disaster recovery system of this embodiment, when a failure occurs at the Tokyo DC, recovery servers are selected from the recovery servers 161 to 163 at the Osaka DC, the applications 151 and 152 are deployed, and the application data 130 is recovered from the backup data 170.

Figure 5:
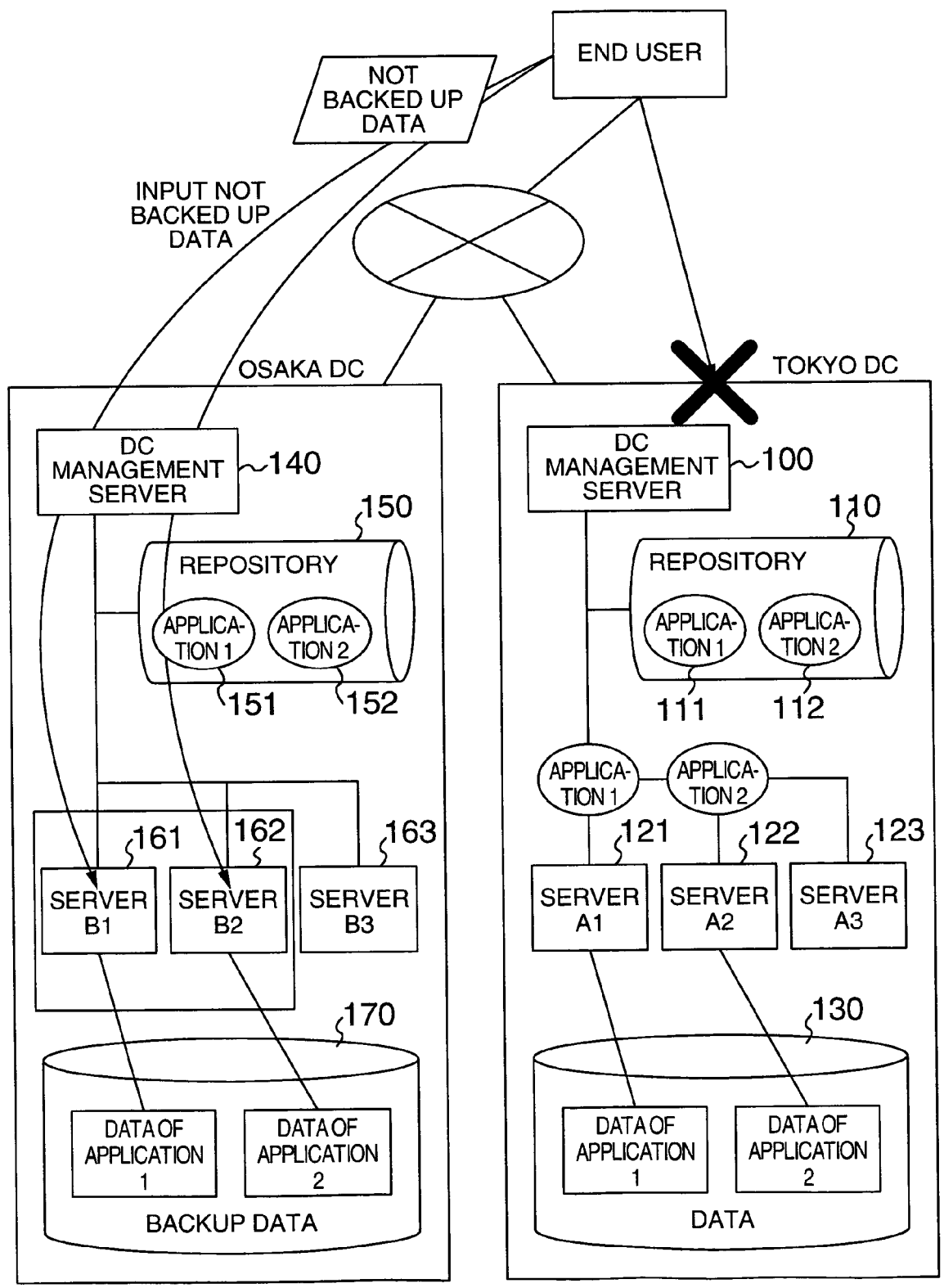
FIG. 5 is a diagram illustrating an input of data still not backed up after the recovery by the backup data according to the embodiment.

FIG. 5 is a diagram illustrating a process of inputting data still not backed up after the recovery of the backup data according to the embodiment. As shown in FIG. 5, in the disaster recovery system of the embodiment, after the failure occurs at the Tokyo DC and the application data 130 is recovered from the backup data 170 at the Osaka DC, the data still not backed up and input to the Tokyo DC during the period after the previous backup and before the failure occurrence, is input to the Osaka DC from an information processing apparatus of the end user.

Figure 6:
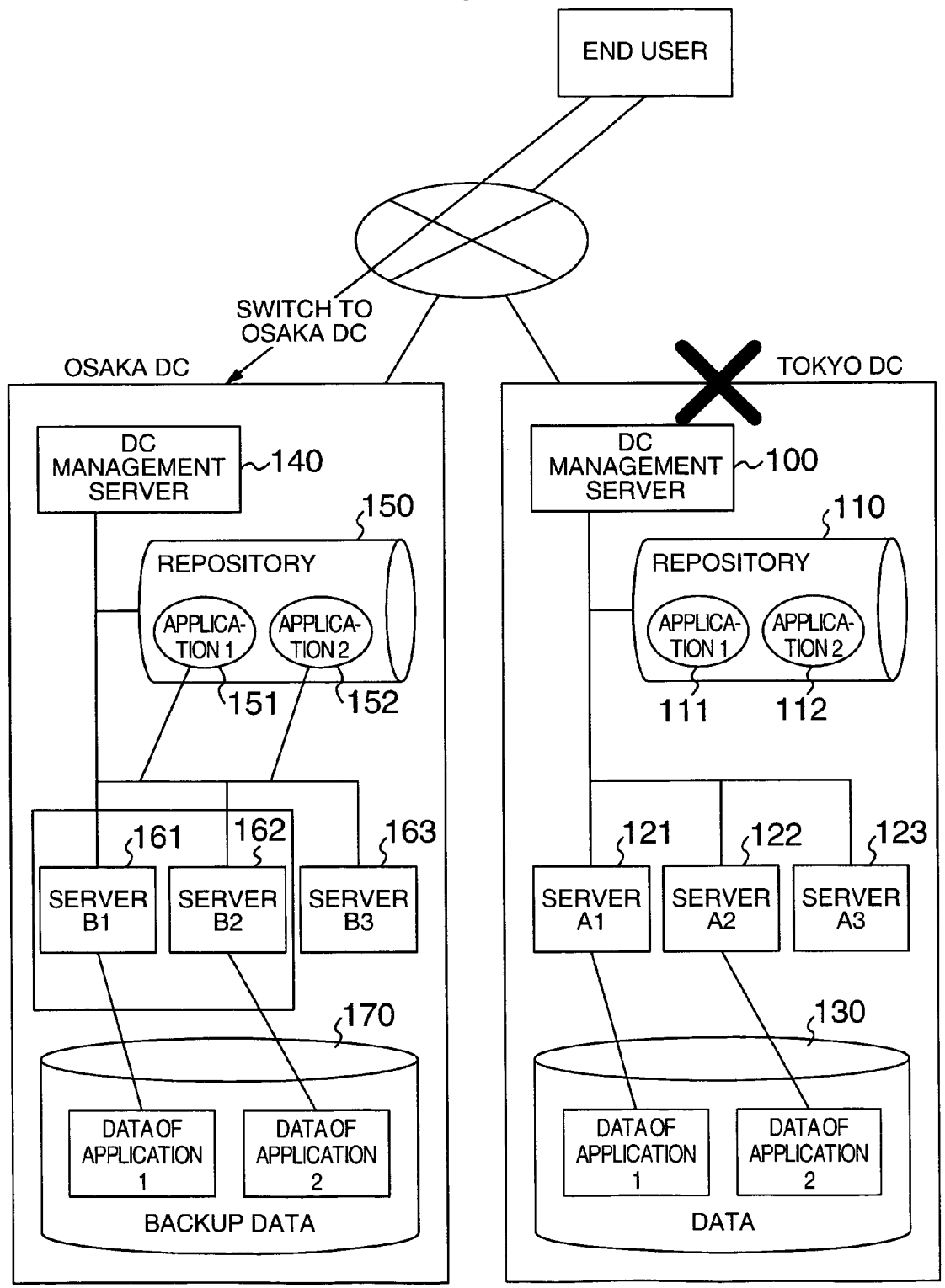
FIG. 6 is a diagram illustrating the summary of a process of continuing an operation of an end user by switching to the Osaka DC after the completion of the recovery according to the embodiment.

FIG. 6 is a diagram showing the outline of the process of continuing the operation of the end user after the recovery completion and switching to the Osaka DC according to the embodiment. As shown in FIG. 6, in the disaster recovery system of this embodiment, after the data still not backed up from the information processing apparatus of the end user is input to the Osaka DC and the recovery at the Osaka DC is completed, use of the applications by the information processing apparatus of the end user is switched from the Tokyo DC to the Osaka DC to continue the operation by using the applications.

Figure 7:
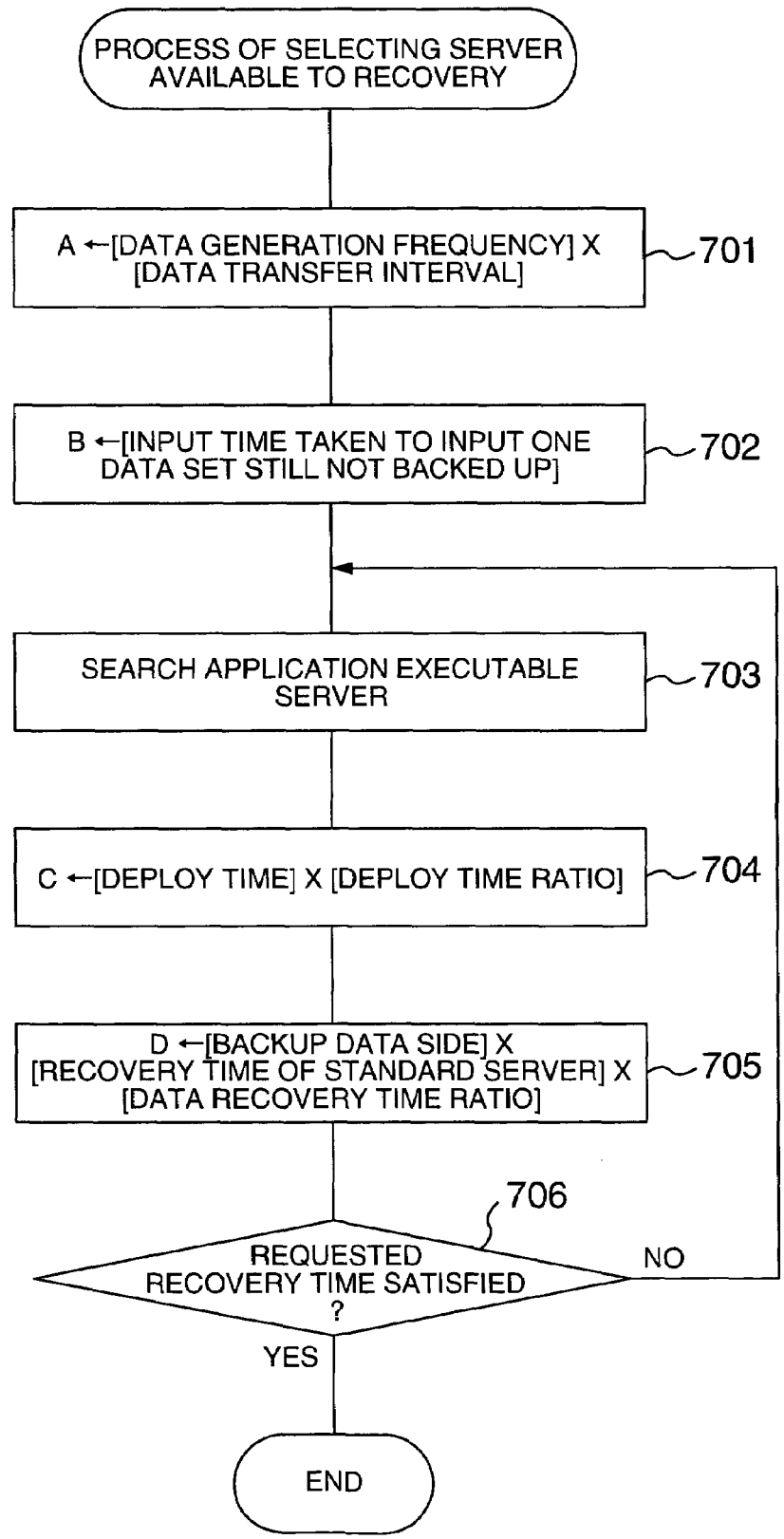
FIG. 7 is a flow chart illustrating a process of selecting a server to be used for recovery according to the embodiment.

FIG. 7 is a flow chart illustrating a process of selecting a server available to the recovery according to the embodiment. As shown in FIG. 7, the server selecting unit 212 of the DC management server 140 selects a server or servers whose necessary recovery time satisfies the predetermined requested recovery time, from the servers 161 to 163 at the Osaka DC. The necessary recovery time includes: a time taken to deploy the applications 151 and 152 same as applications 111 and 112 used at the Tokyo DC in the Osaka DC; a time taken to recover data from the backup data 170 at the Osaka DC; and a time taken to input data still not updated to the Osaka DC, respectively when a failure occurs at the Tokyo DC.

The recovery unit 213 of the DC management server 140 deploys the applications 151 and 152 same as the applications 111 and 112 used at the Tokyo DC in the selected server or servers, and recovers the application data 130 at the Tokyo DC from the backup data 170 at the selected server or servers.

The end user utilizes the Tokyo DC during the normal operation as shown in FIG. 1, and backup data is transferred from the Tokyo DC to Osaka DC at the predetermined time interval as shown in FIG. 3. When a failure occurs at the Tokyo DC as shown in FIG. 4, the Osaka DC selects the servers available to the recovery and deploys the applications in the selected servers and recovers the data from the backup data.

More specifically, first at Step 701 the server selecting unit 212 of the DC management server 140 refers to the application information table 208 to read a data generation frequency and a data transfer interval corresponding to the application used at the Tokyo DC and substitute a product thereof for a variable A.

FIG. 8 is a diagram showing an example of the application information table 208 according to the embodiment. As shown in FIG. 8, the application information table 208 stores information of applications to be used by an end user.

Referring to FIG. 8, an input time is a time taken to input one data set of the application at the information processing apparatus of an end user. A data transfer time interval is a time interval in which data necessary for forming a backup of the application data 130 of the application is transmitted. A data generation frequency is the number of updated data sets per unit hour necessary for using the application. A deploy time is a time taken to deploy the application in the standard server having a deploy time ratio (to be described later) of "1".

The requested recovery time is a user permitted time from a failure occurrence to the recovery completion of the application process. The server selecting unit 212 receives a designated permitted time when the application process starts, from the information processing apparatus of an end user, and sets the received permitted time to the application information table 208 as the requested recovery time.

A priority level is a priority level of the application among a plurality of applications used by an end user. An optional number of additional items may be used. For example, the additional item may be the performance information or the like of the server requested by the application during the operation, and upon occurrence of a failure at the Tokyo DC, the server satisfying the performance information is selected.

Next, at Step 702 the server selecting unit 212 refers to the application information table 208 to read the input time of the data corresponding to the application used at the Tokyo DC and substitute it for a variable B.

At Step 703 the server selecting unit 212 refers to the server list table 209 to search the record of a server which can execute the application used at the Tokyo DC, i.e., the record of a server having the name corresponding to the application used at the Tokyo DC in a use field of the server list table 209.

FIG. 9 is a diagram showing an example of the server list table 209 according to the embodiment. As shown in FIG. 9, the application information table 208 stores the list of servers 161 to 163 usable at DC for the recovery process.

Referring to FIG. 9, ID represents a unique name for identifying each of the servers 161 to 163 at DC. In the use field, it is assumed that a plurality of a list of applications which the server can execute are listed.

A deploy time ratio is a relative value of a deploy time relative to a deploy time of the standard server taken to deploy the application. The deploy time of the standard server in the application information table 208 multiplied by the relative value is the time taken to deploy the application by the server.

A data recovery time ratio is a relative value of a data recovery time relative to a data recovery time taken to recover the data from the backup data 170. The recovery time per unit size taken by the standard server and multiplied by the relative value and the size of the backup data 170 is the time taken to recover the data from the backup data 170 by the server. An optional number of additional items may be used. For example, the additional item may be the performance information or the like of the server requested by the application during the operation, and upon occurrence of a failure at the Tokyo DC, the server satisfying the performance information is selected.

Next, at Step 704 the server selecting unit 212 refers to the application information table 208 to read the deploy time of the application used at the Tokyo DC. Thereafter, the deploy time ratio of the server searched at Step 703 is read from the server list table 209. A product of the deploy time and the deploy time ratio is substituted for a variable C.

At Step 705 the backup data 170 is accessed to acquire the size of the backup data of the application. Thereafter, the data recovery time ratio of the server searched at Step 703 is read from the server list table 209. A product of the backup data size, the recovery time per unit size by the standard server, and the data recovery time ratio is substituted for a variable D.

At Step 706 by referring to the application information table 208, the requested recovery time corresponding to the application used at the Tokyo DC is read. A product of the values of the variables A and B added with the values of the variables C and D is compared with the read requested recovery time.

The product of the values of the variables A and B corresponds to the time taken to input the data still not backed up and generated before the next data transfer time, to the Osaka DC. The value of the variable C corresponds to the time taken to deploy the application in the server. The value of the variable D corresponds to the time taken to recover the backup data of the application by the server. When the value of the variable A is to be calculated at Step 701, instead of using the data transfer interval, a lapse time from the preceding backup execution time may be used to use the data generated during the lapse time from the preceding backup execution time as the data still not backed up.

If the comparison result at Step 706 indicates that the addition result is shorter than the requested recovery time, the server searched at Step 703 is used as the server at the Osaka DC for the data recovery to complete the server selecting process for the application. If not, the flow returns to Step 703 whereat another candidate server is searched.

It there are a plurality of applications used at the Tokyo DC, the processes from Step 701 to Step 706 are repeated necessary times to select servers other than the already selected server as the servers to be used for the data recovery.

Thereafter, an application is deployed in each selected server in the manner similar to that described above and the data is recovered from the backup data. Thereafter, the data still not backed up is entered as shown in FIG. 5 and the end user continues the process by switching to the Osaka DC as shown in FIG. 6.

According to the embodiment described above, the recovery process is performed by selecting a server whose necessary recovery time including the time necessary for entering data still not backed up satisfies the predetermined requested recovery time. For example, if the data to be dealt with has less urgency and a small number of renewal occurrence frequencies, such as resident card data of a local self-governing body, data still not backed up when a failure occurs is input manually for the data recovery. A relatively loose recovery process can therefore be permitted and a disaster recovery system of a low cost can be provided.

Next, in the recovery system of this embodiment, another process will be described in which a serve is selected from the servers 161 to 163 at the Osaka DC in the order of a higher priority level of an application or an end user among a plurality of end users.

Figure 10:
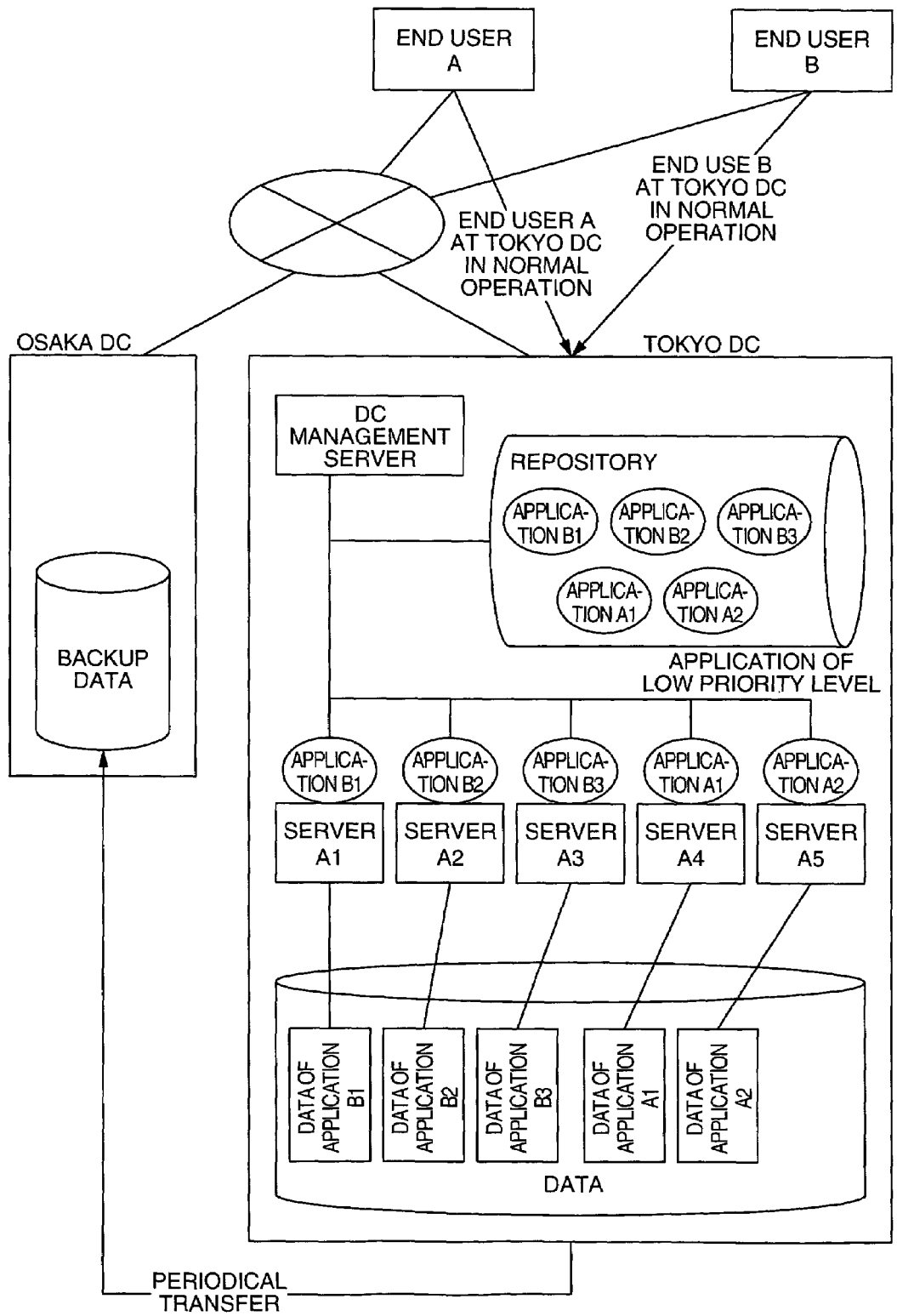
FIG. 10 is a diagram illustrating the normal operation by a plurality of end users at the Tokyo DC according to the embodiment.

FIG. 10 is a diagram illustrating the normal operation while a plurality of end users utilize the Tokyo DC according to the embodiment. In the example shown in FIG. 10, information processing apparatuses of end users A and B and the Tokyo DC and Osaka DC are interconnected by the network.

The end users A and B utilize a plurality of applications at the Tokyo DC during the normal operation, and backup data is transferred to the Osaka DC at a predetermined time interval.

When a failure occurs at the Tokyo DC, the server selecting unit 212 of the Osaka DC calculates a difference between priority levels of a plurality of applications used at the Tokyo DC. In this case, the priority order of each application used at DC for the recovery process is decided by using as the calculation parameters the priority level (a priority level of an application used by each end user) in the application information table 208 and the priority level (a priority level of an end user utilizing DC) in the user priority level table 210.

FIG. 11 is a diagram showing an example of the user priority table 210 of the embodiment. As shown in FIG. 11, the user priority level table 210 stores information representative of the priority level of each user. By using the value of the priority level stored in this table and the value of the priority level stored in the application information table 208, the priority order of each application at DC is decided.

For example, in accordance with the "[priority level of an application used by an end user]×[priority level of the end user], the priority order of the application is decided for the recovery process at the Osaka DC. Other calculation methods may also be incorporated. Without using the user priority level table 209, the priority level of each user's application for the recovery process at DC may be directly stored in the application information table 208.

Figure 12:
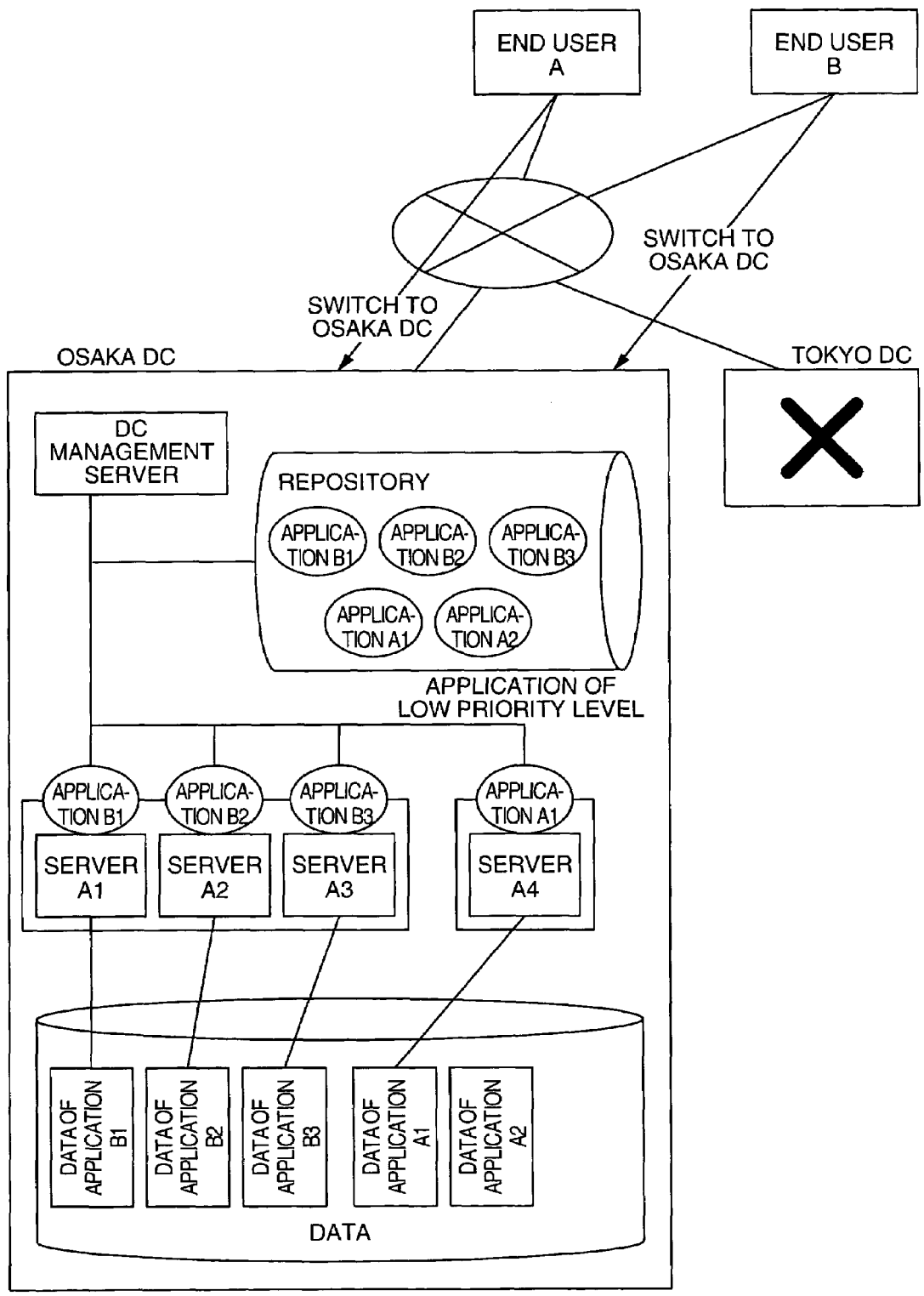
FIG. 12 is a diagram showing an example of the result of recovery at the Osaka DC when a failure occurs at the Tokyo DC used by a plurality of end users according to the embodiment.

In the order of a higher priority level determined in this manner, the server selecting process illustrated in FIG. 7 is executed so that the disaster recovery with a priority level can be realized. FIG. 12 shows an example of the result of an actual recovery process executed in this manner.

FIG. 12 is a diagram showing an example of the recovery result at the Osaka DC after a failure occurs at the Tokyo DC used by a plurality of end users. In the example shown in FIG. 12, the end user B has a higher priority level than that of the end user A and the application A1 used by the end user A has a higher priority level than that of the application A2. Because of these priority orders, the application A2 is not subjected to the recovery process at the Osaka DC having an insufficient number of servers.

In the disaster recovery system of the embodiment described above, when a failure occurs, the application having a low priority level is not subjected to the recovery process and waits for the recovery of the Tokyo DC. Needs for such a relatively loose recovery can be met.

In the recovery system of this embodiment, if there is an application not subjected to the recovery process, information of the application may be notified to another DC to inquire the DC management server of the other DC about whether or not the recovery is possible. If the recovery is possible, the backup data for the application is transferred to the other DC to perform the recovery process.

As described above, in the disaster recovery system of the embodiment, the recovery process is performed by selecting an information processing apparatus whose necessary recovery time including the time necessary for entering data still not backed up satisfies the predetermined requested recovery time. It is therefore possible to meet the needs for a relatively loose recovery of data still not backed up at the time of a failure by later inputting it.

According to the invention, since the recovery process is performed by selecting an information processing apparatus whose necessary recovery time including the time necessary for entering data still not backed up satisfies the predetermined requested recovery time, it is possible to meet the needs for a relatively loose recovery of data still not backed up at the time of a failure by later inputting it.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A disaster recovery method of recovering a process at a data center when a failure occurs at another data center during execution of the process, comprising steps of:
   transmitting data at a first data center normally used to a second data center at a predetermined time interval and forming a backup of the received data at said second data center;
   when a failure occurs at said first data center, selecting an information processing apparatus whose necessary recovery time including a time taken to input data still not backed up satisfies a predetermined requested recovery time, from information processing apparatuses in said second data center; and
   deploying an application used at said first data center in said selected information apparatus and recovering the data at said first data center from said backup at said selected information processing apparatus.

2. A disaster recovery method according to claim 1, wherein:
   said second data center calculates a first data amount obtained by multiplying the number of data generation frequencies representative of how many times the data at said first data center is generated per unit time, by said predetermined time interval of forming said backup; and
   a time taken to input data of said first data amount into said second data center is used as the time taken to input said data still not backed up.

3. A disaster recovery method according to claim 1, wherein an end user of the application designates an allowable time taken to resume processing the application, and the allowable time is set as said predetermined requested recovery time.

4. A disaster recovery method according to claim 1, wherein said predetermined time interval of forming said backup is adjusted so that said necessary recovery time satisfies said predetermined requested time.

5. A disaster recovery method according to claim 1, wherein if there are a plurality of end users, the information processing apparatus in said second data center is selected in the order of a higher priority level of the application or the end user.

6. A disaster recovery method according to claim 1, wherein if there is an application for which the information processing apparatus in said second data center was not selected, another data center is inquired about whether the other data center can recover the data.

7. A disaster recovery system for recovering a process at a data center when a failure occurs at another data center during execution of the process, comprising:
   a backup forming unit for transmitting data at a first data center normally used by an end user to a second data center at a predetermined time interval and forming a backup of the received data at said second data center;
   an information processing apparatus selecting unit for, when a failure occurs at said first data center, selecting an information processing apparatus whose necessary recovery time including a time taken to input data still not backed up satisfies a predetermined requested recovery time, from information processing apparatuses in said second data center; and
   a recovery unit for deploying an application used at said first data center in said selected information apparatus and recovering the data at said first data center from said backup at said selected information processing apparatus.

8. A disaster recovery system according to claim 7, wherein said information processing apparatus selecting unit receives an allowable time taken to resume processing the application designated by an end user of the application, and sets the allowable time as said predetermined requested recovery time.

9. A disaster recovery system according to claim 7, wherein said backup forming unit adjusts said predetermined time interval of forming said backup so that said necessary recovery time satisfies said predetermined requested time.

10. A disaster recovery system according to claim 7, wherein if there are a plurality of end users, said information processing apparatus selecting unit selects the information processing apparatus in said second data center in the order of a higher priority level of the application or the end user.

11. A disaster recovery system according to claim 7, wherein if there is an application for which the information processing apparatus in said second data center was not selected, said information processing selecting unit inquires another data center about whether the other data center can recover the data.

12. A storage medium storing a program for making computers function as a disaster recovery system for recovering a process at a data center when a failure occurs at another data center during execution of the process, wherein the computers are made to function as:
   a backup forming unit for transmitting data at a first data center normally used by an end user to a second data center at a predetermined time interval and forming a backup of the received data at said second data center;
   an information processing apparatus selecting unit for, when a failure occurs at said first data center, selecting an information processing apparatus whose necessary recovery time including a time taken to input data still not backed up satisfies a predetermined requested recovery time, from information processing apparatuses in said second data center; and
   a recovery unit for deploying an application used at said first data center in said selected information apparatus and recovering the data at said first data center from said backup at said selected information processing apparatus.

* * * * *